United States Patent [19]

Marsh et al.

[11] Patent Number: 5,537,309

[45] Date of Patent: *Jul. 16, 1996

[54] MULTI-PHASE AND SHIFTED PHASE POWER DISTRIBUTION SYSTEMS

[75] Inventors: John K. Marsh, Rome City; Russell E. Zemen, Jr., Fort Wayne, both of Ind.

[73] Assignee: Group Dekko International, LaOtto, Ind.

[*] Notice: The term of this patent shall not extend beyond the expiration date of Pat. No. 5,412,187.

[21] Appl. No.: 870,880

[22] Filed: Apr. 20, 1992

Related U.S. Application Data

[63] Continuation-in-part of Ser. No. 722,935, Jun. 28, 1991, Pat. No. 5,107,410.

[51] Int. Cl.$^6$ ............................................. H02M 5/10
[52] U.S. Cl. ..................... 363/155; 363/156; 323/215; 323/361
[58] Field of Search ................................. 323/205, 215, 323/361; 363/2, 3, 4, 36, 39, 148, 149, 152, 153, 154, 155, 156

[56] References Cited

U.S. PATENT DOCUMENTS

| | | | |
|---|---|---|---|
| 412,932 | 10/1889 | Shallenberger | 307/3 |
| 771,786 | 10/1904 | Lunt | 363/154 |
| 815,765 | 3/1906 | Troy | 307/131 |
| 1,082,561 | 12/1913 | Schwarz | 307/13 |
| 1,175,320 | 3/1916 | Varley . | |
| 1,188,145 | 6/1916 | Blume . | |
| 1,480,712 | 1/1924 | Fortescue | 307/13 |
| 1,727,834 | 9/1929 | Kubler | 307/105 |
| 2,024,746 | 12/1935 | Rose et al. . | |
| 2,085,123 | 6/1937 | Rose . | |
| 2,128,055 | 8/1938 | Rose . | |
| 2,166,900 | 7/1939 | Bohn et al. . | |
| 2,306,226 | 12/1942 | Schrage | 307/13 |
| 2,307,527 | 1/1943 | Maslin et al. | 363/154 |
| 2,330,088 | 9/1943 | St. Palley | 307/13 |
| 2,632,878 | 3/1953 | Uhlmann | 363/154 |
| 2,634,396 | 4/1953 | Solomon . | |

(List continued on next page.)

OTHER PUBLICATIONS

"Nonlinear Loads Mean Trouble", Arthur Freund, Senior Editor, Electrical Construction & Maintenance, Mar. 1988.
"Double the Neutral and Derate the Transformer–or Else?", Arthur Freund, Senior Editor, Electrical Construction & Maintenance, Dec. 1988.
"Harmonic Analyzer Helps Solve Power Problems", David Kreiss, Electrical Construction & Maintenance, Mar. 1989.

*Primary Examiner*—Jeffrey L. Sterrett
*Attorney, Agent, or Firm*—Barnes & Thornburg

[57] ABSTRACT

A method and apparatus for providing a source of alternating current electrical power to a plurality of loads in an office environment, including a plurality of non-linear loads which draw power for only a portion of the alternating current cycle, includes an input source of electrical power to a primary side of a power transforming device which provides an output at its secondary side which comprises at least two phases and a shared neutral. The plurality of loads are evenly distributed between each phase of the output power source and the shared neutral so as to reduce by current cancellation the current which would otherwise flow in the shared neutral conductor due to the presence of the non-linear loads. In one embodiment, each of six output phase is separated from the other by 120 electrical degrees, and the fourth, fifth and sixth phases are separated from the first, second and third phases, respectively, by 180 electrical degrees. In another embodiment, two sets of six phases are provided, with each of the phases in the first set shifted, relative to respective phases of the second set, so as to reduce variations in the level of instantaneous power drawn from the input source which would otherwise occur due to the presence of the non-linear loads. Additional embodiments incorporate autotransformers which may be advantageous in smaller or preexisting installations. Benefits of the invention include lower ground to neutral noise, reduced transmission losses, more accurate power measurement by induction watt-hour meters, and fewer instances of neutral current overload.

18 Claims, 8 Drawing Sheets

U.S. PATENT DOCUMENTS

| | | | |
|---|---|---|---|
| 3,211,914 | 10/1965 | Anderson | 307/3 |
| 3,942,032 | 3/1976 | Casazza | 307/148 |
| 4,053,820 | 10/1977 | Peterson et al. | 307/3 |
| 4,106,089 | 8/1978 | Fettinger | 363/153 |
| 4,689,735 | 8/1987 | Young | 363/155 |
| 4,695,933 | 9/1987 | Nguyen et al. | 363/98 |
| 4,779,181 | 10/1988 | Traver et al. | 363/154 |
| 4,849,870 | 7/1989 | Heinrich | 307/3 |
| 5,046,963 | 9/1991 | Kelly | 439/211 |
| 5,107,410 | 4/1992 | Marsh et al. | 363/154 |

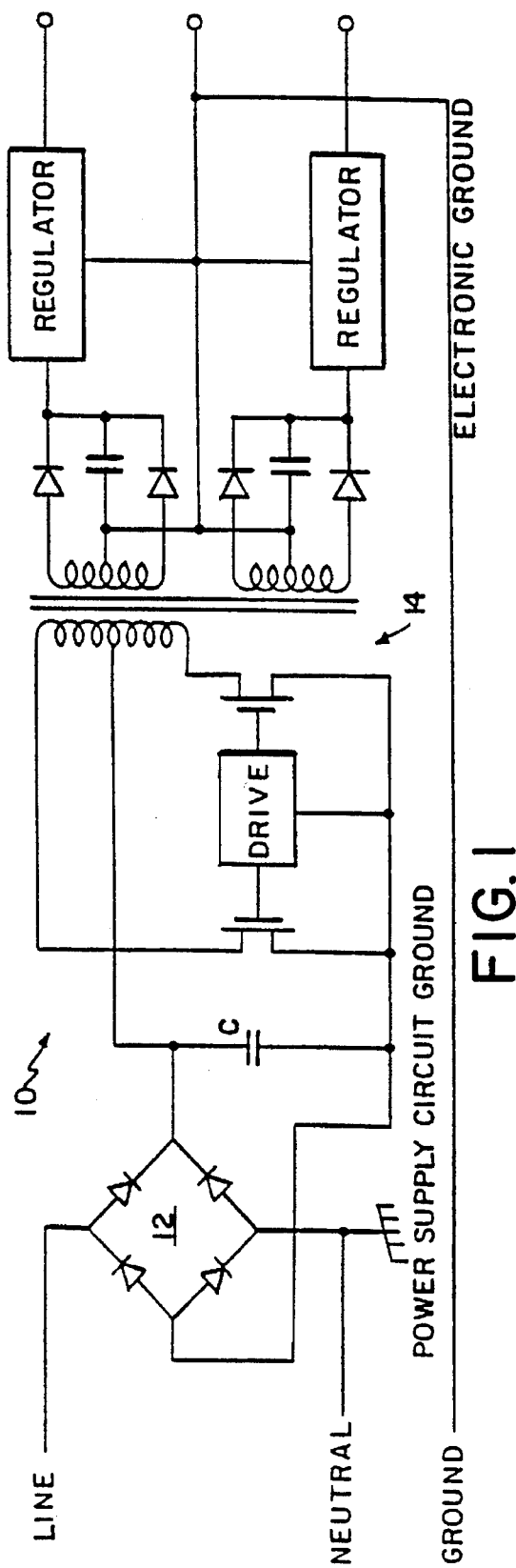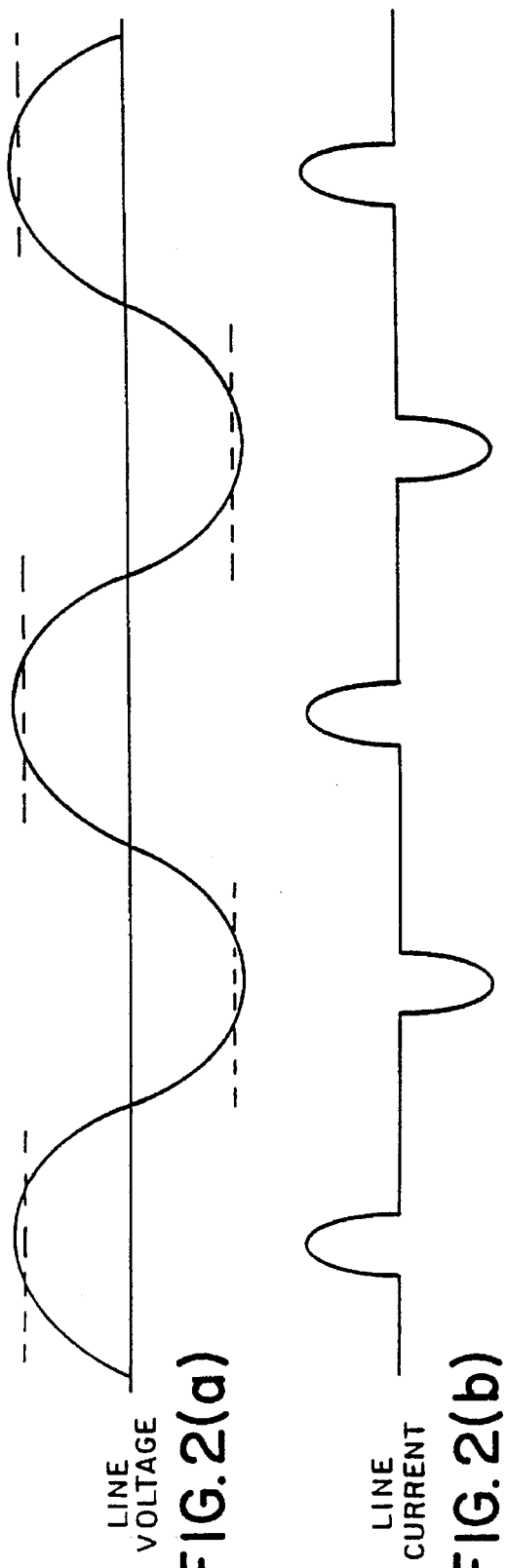
FIG. 1
PRIOR ART
FIG. 2(a)
LINE VOLTAGE
FIG. 2(b)
LINE CURRENT 5,537,309

MULTI-PHASE AND SHIFTED PHASE POWER DISTRIBUTION SYSTEMS

BACKGROUND AND SUMMARY OF THE INVENTION

This is a continuation-in-part application of U.S. Ser. No. 07/722,935, filed Jun. 28, 1991, now U.S. Pat. No. 5,107,410.

The present invention relates generally to power distribution systems and, more particularly, to power distribution systems for offices and other environments in which power is supplied to a large number of computers or other pulsed, non-linear electrical loads.

Office power distribution systems supply electrical power to a variety of single phase and three-phase electrical loads. Typical loads have, in the past, included motors, lighting fixtures, and heating systems. These loads are, for the most part, linear in nature. When an alternating current is applied to a linear load, the current increases proportionately as the voltage increases and decreases proportionately as the voltage decreases. Resistive loads operate with a power factor of unity (i.e., the current is in phase with the voltage). In inductive circuits, current lags voltage by some phase angle resulting in circuits which operate with a power factor of less than one. In a capacitive circuit, the current leads the voltage. However, in all of these circuits, current is always proportional to the voltage and, when a sinusoidal voltage is applied to the load, the resulting current is also sinusoidal.

Until recently, almost all loads found in a typical office environment were linear loads. However, computers, variable speed motor drives, and other so-called "electronic" loads now comprise a significant and growing portion of the electrical load present in offices. These electronic loads are, for the most part, non-linear in nature. These loads have become a significant factor in many office power distribution systems, and their presence has lead to a number of problems and office power system malfunctions.

A non-linear load is one in which the load current is not proportional to the instantaneous voltage and, in many cases, is not continuous. It may, for example, be switched on for only part of a 360 electrical degree alternating current cycle.

The presence of non-linear loads on a power system can cause numerous problems. Typical office power distribution systems operate as three-phase 208/120 volt systems with a shared neutral conductor serving as a return path for currents from each of the three phases. Linear loads which are balanced among the three phases produce currents which typically cancel in the shared neutral conductor resulting in relatively low net current flow in the neutral. Pulsed currents produced by non-linear loads do not cancel in the neutral conductor because they typically do not occur simultaneously. These currents tend to add on the neutral even when the three phases of the system are carefully balanced. The resulting high current flows in the neutral conductor can lead to severe overheating or burnout of neutral conductors, and increased noise levels on the neutral. Pulsed, non-linear currents further cause relatively large variations in the instantaneous power demanded from the generator. These variations can cause problems and inefficiencies on the generator and distribution side of the transforming device. Moreover, pulsed, non-linear currents may cause typical induction watt-hour meters to show large calibration errors.

An object of the present invention is to provide a power distribution system for an office environment in which the adverse affects of pulsed, non-linear loads are reduced.

This object is achieved in a power distribution system in which three-phase electrical power is supplied to a primary side of a power transforming device, and in which at least six phases and a shared neutral conductor are provided at the secondary side of the transforming device. A plurality of electrical loads, including non-linear loads, are distributed between each of the six phases and the shared neutral so as to reduce by current cancellation the current which would otherwise flow in the shared neutral conductor due to the presence of the non-linear loads. Each of the first, second and third of the six phases provided at the output of the transforming device are preferably separated from each other by 120 electrical degrees. The fourth, fifth and sixth of these phases are also preferably separated from each other by 120 electrical degrees, and are from the first, second and third phases, respectively, by 180 electrical degrees. In a particularly preferred embodiment of the invention, at least 12 phases are produced at the secondary side of the power transforming device. Each of these 12 phases is preferably separated from the other phases by 30 electrical degrees. In this embodiment, the 12 phases may be viewed as two sets of six phases, with each of the phases in a first of the two sets shifted relative to respective phases of the second set, so as to reduce variations in the level of instantaneous power drawn from the input source which would otherwise occur due to the presence of the non-linear loads. In this preferred embodiment, the six phases in the first set are preferably shifted by 30 electrical degrees relative to respective ones of the six phases in the second set. This may be advantageously accomplished by shifting each set of six phases by 15 electrical degrees in opposite directions relative to the phase angles of the incoming power source.

Other alternative embodiments of the invention which may be particularly useful in smaller power systems, or in retrofitting existing power systems, include systems which may have one, two or three input phases, and two, four, or six output phases, respectively. Illustrative embodiments of these systems may incorporate an autotransformer which is serially connected to an input phase to generate a second output circuit having a phase angle which has been shifted by 180 electrical degrees relative to the input circuit. This shifted circuit, when sharing a neutral with a circuit having the original phase, would offer the current cancellation advantage discussed above.

Other objects, advantages and novel features of the present invention will become apparent from the following detailed description of the invention when considered in conjunction with the accompanying drawings.

BRIEF DESCRIPTION OF THE DRAWINGS

FIG. 1 shows a switched power supply circuit of the type commonly used in devices such as personal computers.

FIGS. 2(a) and 2(b) show the waveforms of the input line voltage and line current associated with power supply circuit 10 of FIG. 1.

3

Figure 5:
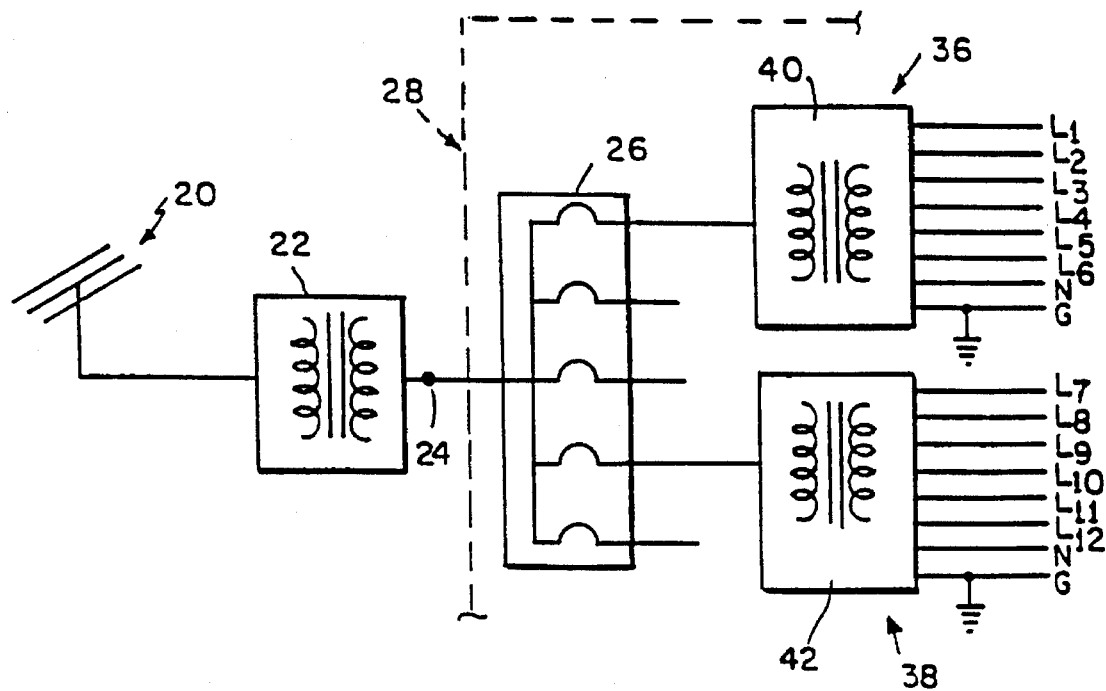

FIG. 5 shows a schematic wiring diagram of a power distribution system of the present invention.

Figure 6:
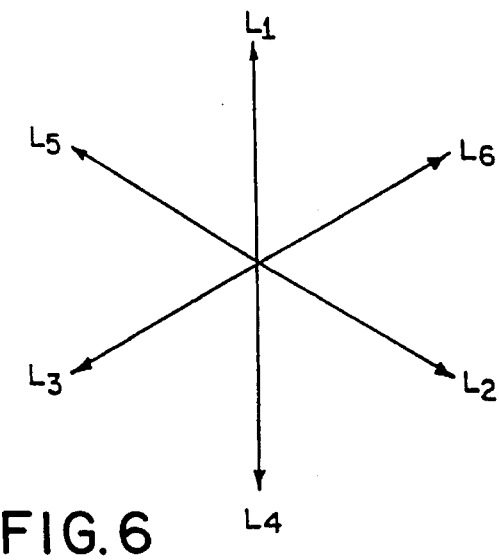

FIG. 6 is a vector phase diagram which illustrates the phase separation existing between phases L1–L6 of FIG. 5.

Figure 7:
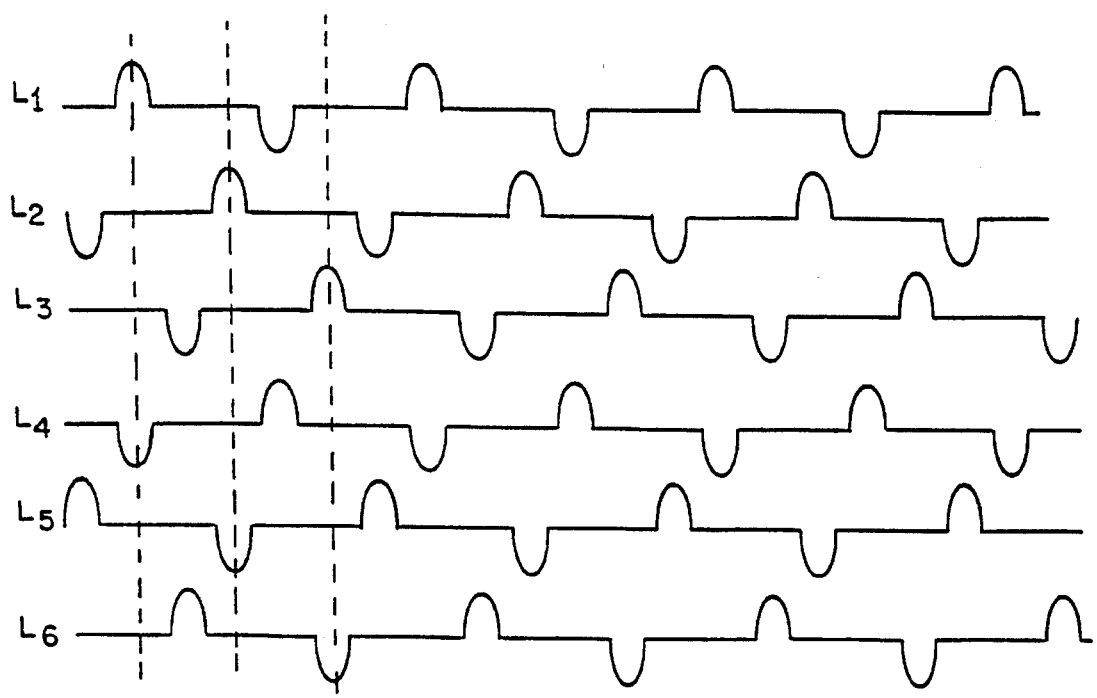

FIG. 7 graphically illustrates the current waveform for each of phases L1–L6 of FIG. 5 when a power supply circuit of the type illustrated in FIG. 1 is connected between each phase and a shared neutral conductor.

Figure 8:

FIG. 8 graphically illustrates variations in the level of power drawn by the loads connected between phases L1–L6 of FIG. 5.

Figure 9:
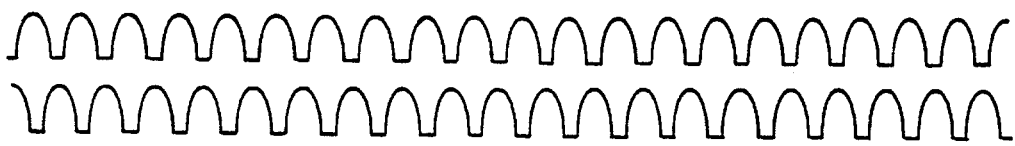

FIG. 9 graphically illustrates the variations in the level of power drawn by the loads connected between phases L1–L6 and the shared neutral of FIG. 5, and by an identical set of loads identically connected between phases L7–L12 of FIG. 5.

Figure 10:
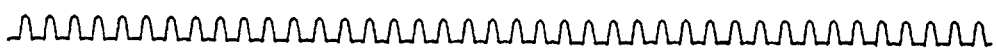

FIG. 10 shows a summation of the waveforms illustrated in FIG. 8.

Figure 11:
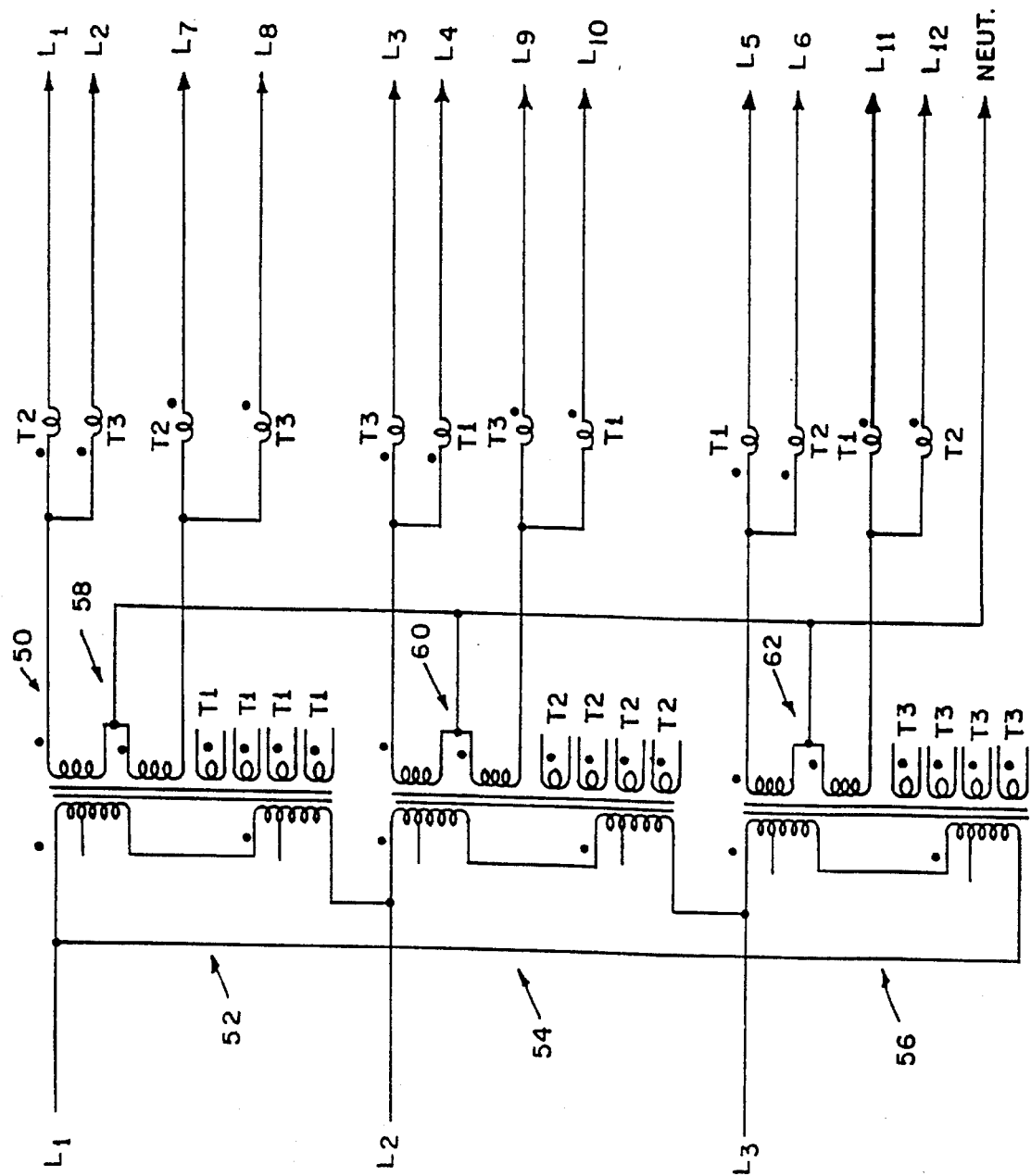

FIG. 11 schematically illustrates a transforming device constructed in accordance with the principles of the present invention.

Figure 12:
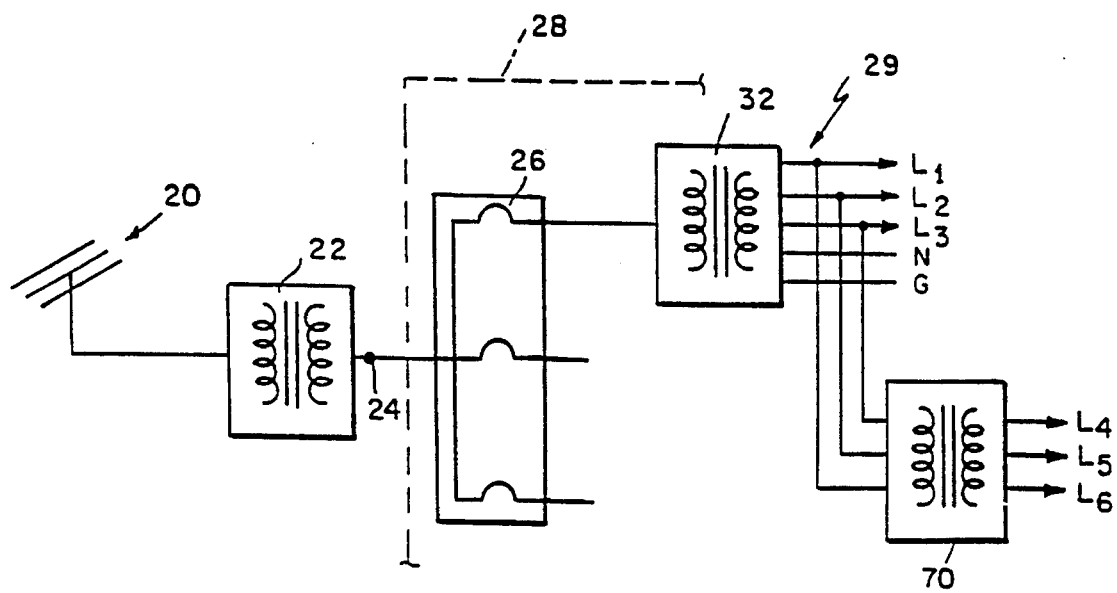

FIG. 12 shows a schematic wiring diagram of an alternative embodiment of a power distribution system constructed in accordance with the principles of the present invention.

Figure 13:
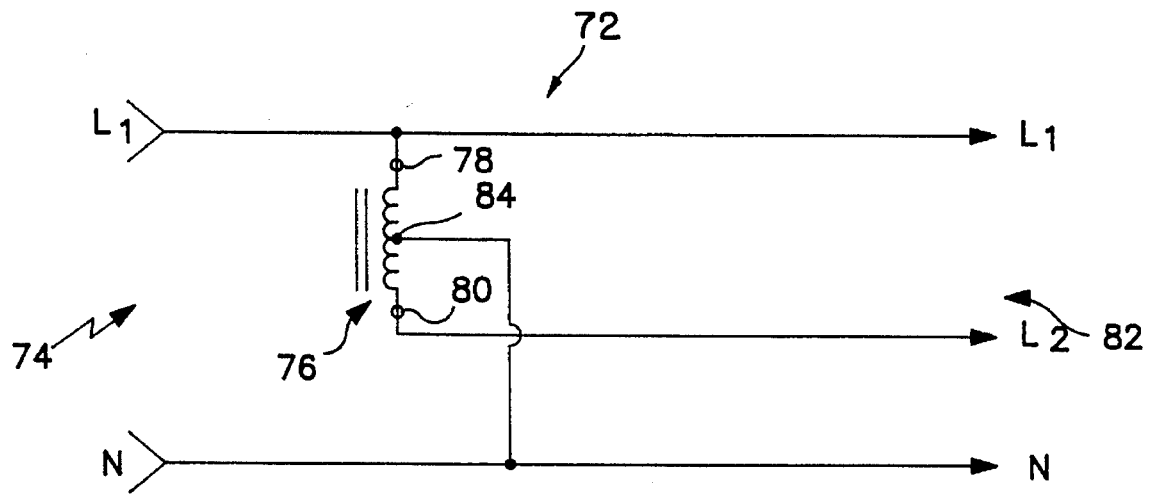

FIG. 13 shows a schematic wiring diagram of another alternative embodiment of a power distribution system constructed in accordance with the principles of the present invention.

Figure 14:
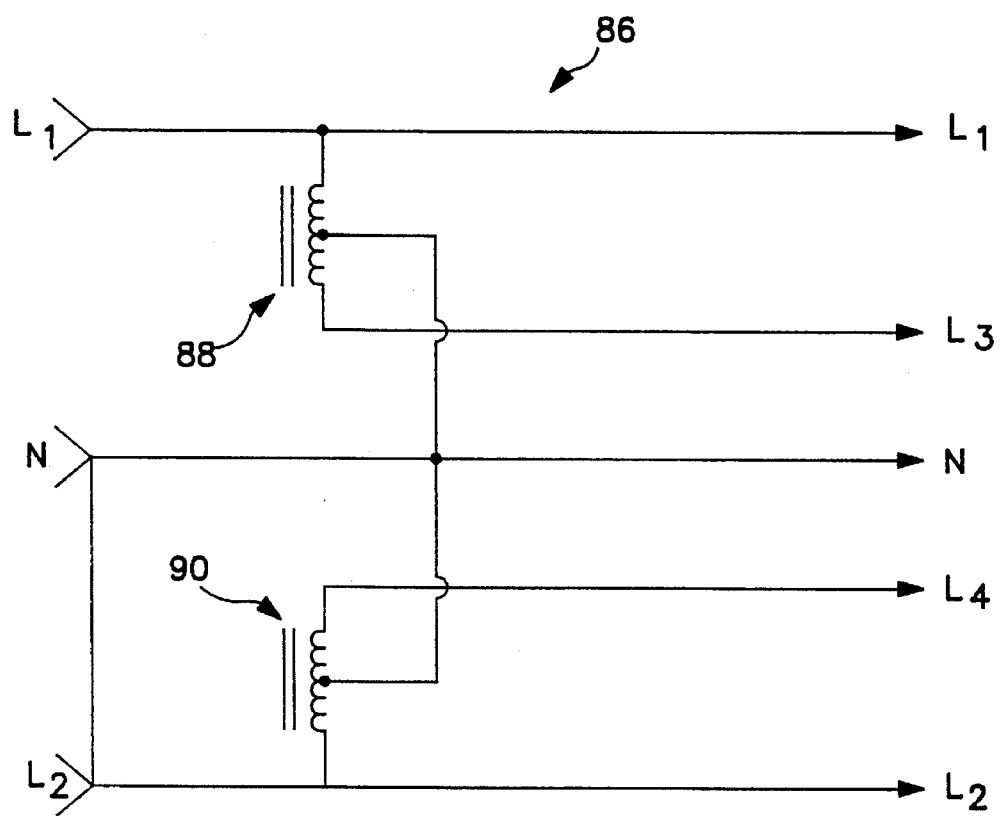

FIG. 14 shows a schematic wiring diagram of yet another alternative embodiment of a power distribution system constructed in accordance with the principles of the present invention.

Figure 15:
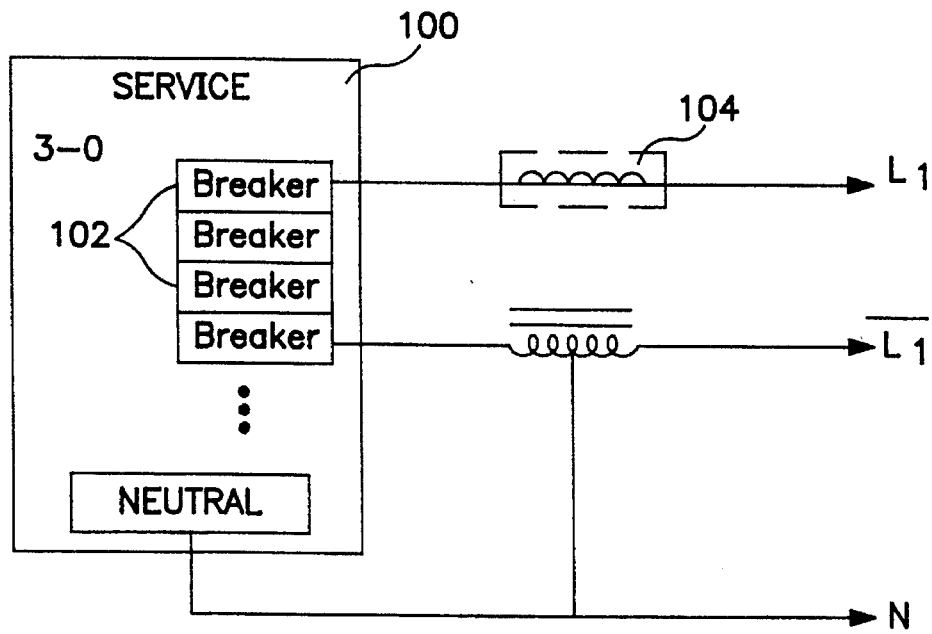

FIG. 15 shows a schematic wiring diagram of an alternative embodiment of a power distribution system similar to the system shown in FIG. 13.

Figure 16:
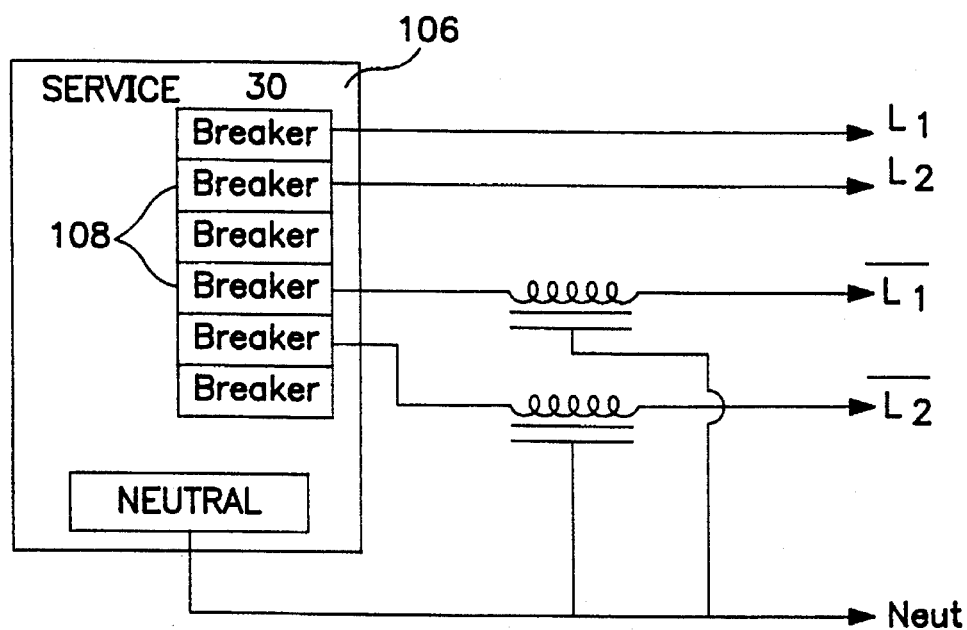

FIG. 16 shows a schematic wiring diagram of an alternative embodiment of a power distribution system similar to the system shown in FIG. 14.

DETAILED DESCRIPTION OF THE DRAWINGS

FIG. 1 shows a switched power supply circuit 10 of the type commonly used in personal computers. In power supply circuit 10 of FIG. 1, line voltage is rectified by a bridge rectifier 12 at the input of circuit 10. The resulting DC power charges capacitor C. A chopping circuit 14 is used to convert the resulting DC power back to AC power for subsequent transformation and regulation as required by the particular device incorporating the power supply.

FIGS. 2(a) and 2(b) show the waveforms of the input line voltage and line current associated with power supply circuit 10 of FIG. 1. Since the diodes in bridge circuit 12 conduct only when the forward biasing voltage exceeds the voltage across capacitor C, line current flows into power supply circuit 10 in accordance with the waveform shown in FIG. 2(b). As shown, the line current drawn by power supply circuit 10 consists of a series of positive and negative peaks which are aligned with the positive and negative peaks of the line voltage, and which are separated by relatively long periods during which no line current flows. The "dwell" or conduction angle of each peak is typically 40–50 electrical degrees, but will vary in accordance with the demand for power at the output of power supply circuit 10.

4

Figure 3:
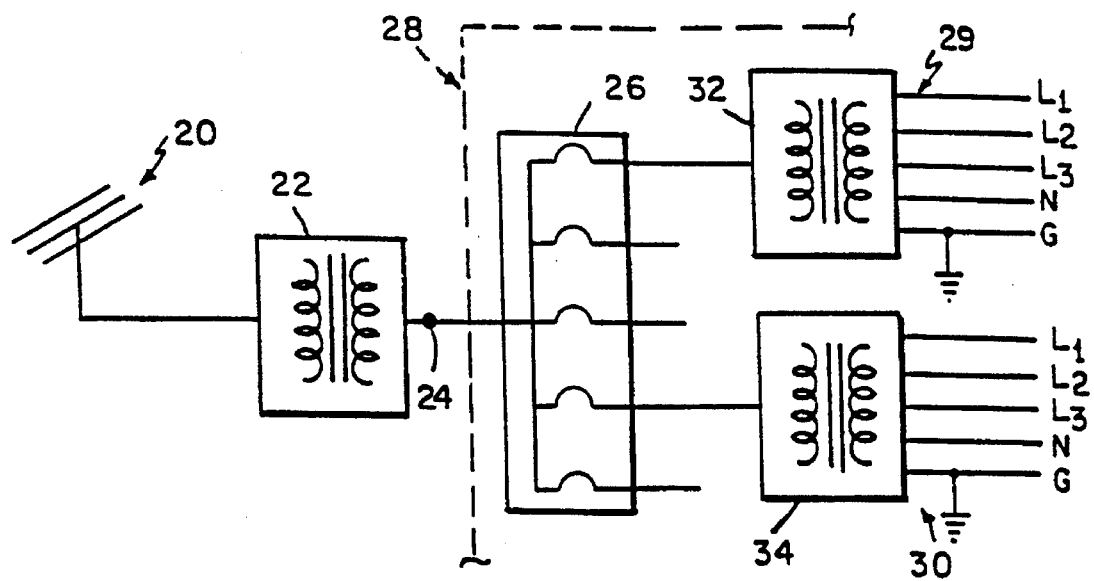
FIG. 3 shows a schematic wiring diagram of a prior art office power distribution system.

FIG. 3 shows a schematic wiring diagram of a power distribution system for office power systems commonly used in the prior art. In the arrangement shown in FIG. 3, three-phase power is supplied from utility lines 20 at a relatively high voltage to the primary of a transforming device 22. The secondary of transforming device 22 provides three-phase power, typically at 480 volts, via conductors 24 to a service entrance or panel 26 of a customer. In this instance, service panel 26 may be located in an office building 28, schematically represented by dashed lines in FIG. 3. Connected to the output side of panel 26 are a plurality of distribution circuits represented generally by circuits 29 and 30. Circuits 29 and 30 typically include three-phase transforming devices 32 and 34, respectively. Electrical power is provided to the primary sides of transforming devices 32 and 34 from panel 26 at 480 volts (line to line) and is stepped down to voltage levels of 208 volts (line to line) and 120 volts (line to neutral). The secondary or output sides of transforming devices 32 and 34 are connected to a variety of loads, including lighting loads, computers and convenience outlets. Loads are typically connected between one of the three line conductors L1, L2 and L3, and a shared neutral conductor N. A separate ground conductor is also provided. Voltages on lines L1, L2 and L3 are 120 electrical degrees out of phase. When resistive loads are connected between each phase conductor and the shared neutral in a balanced manner, no current flows in the shared neutral due to current cancellation effects resulting from the relative phase relationships existing between the voltages on line conductors L1, L2 and L3.

Figure 4A:
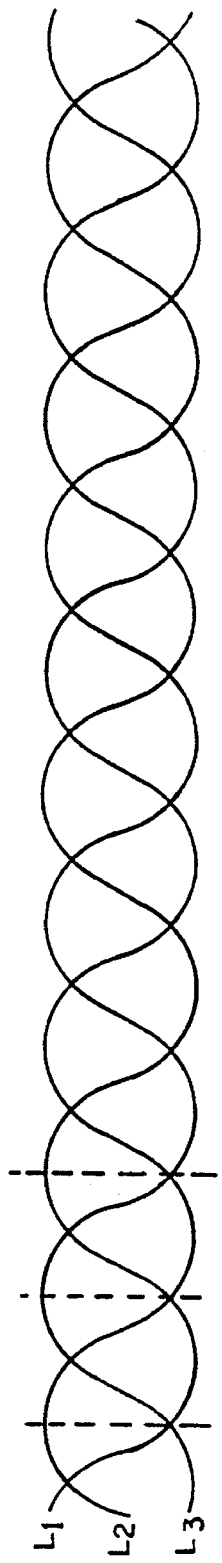
FIG. 4a graphically illustrates the line voltages present on each of phases L1, L2 and L3 in the circuits of FIG. 3.
Figure 4B:
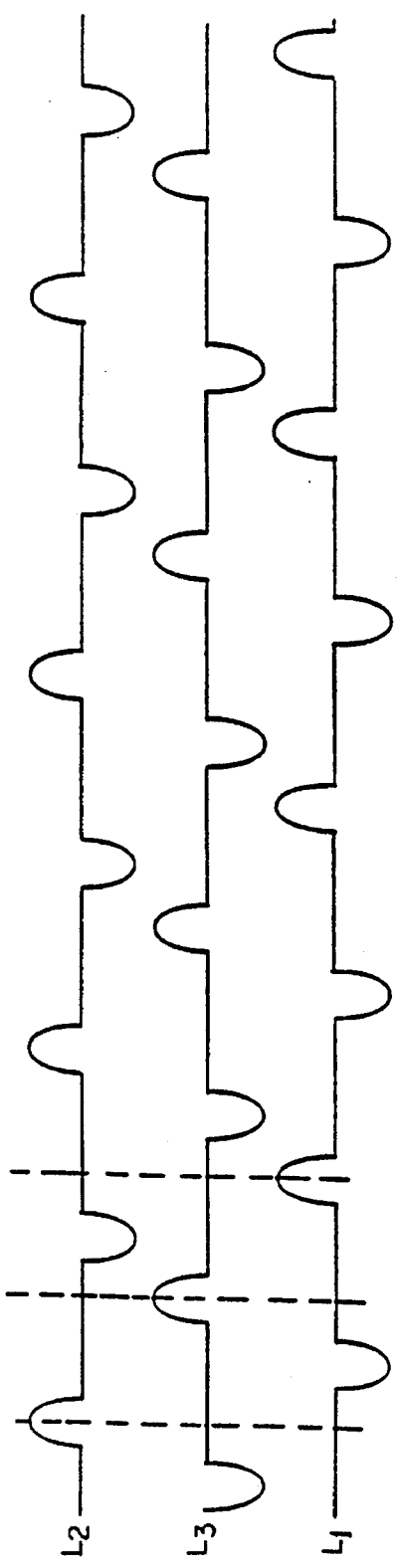
FIG. 4b graphically illustrates the current waveform for each phase of the circuits shown in FIG. 3 when a power supply circuit for the type shown in FIG. 1 is connected between each phase and the shared neutral.

FIG. 4(a) graphically illustrates the line voltages present on each of phases L1, L2 and L3 in the circuits of FIG. 3. As illustrated, each phase is separated from, or shifted relative to, the other two phases by 120 electrical degrees. FIG. 4(b) graphically illustrates the current waveform for each phase when a power supply circuit of the type illustrated in FIG. 1 is connected between each phase conductor and the shared neutral conductor N. As discussed in connection with FIGS. 1 and 2 above, line current flows in each phase for only a portion of each half cycle due to the design of the power supply circuit.

Figure 4C:
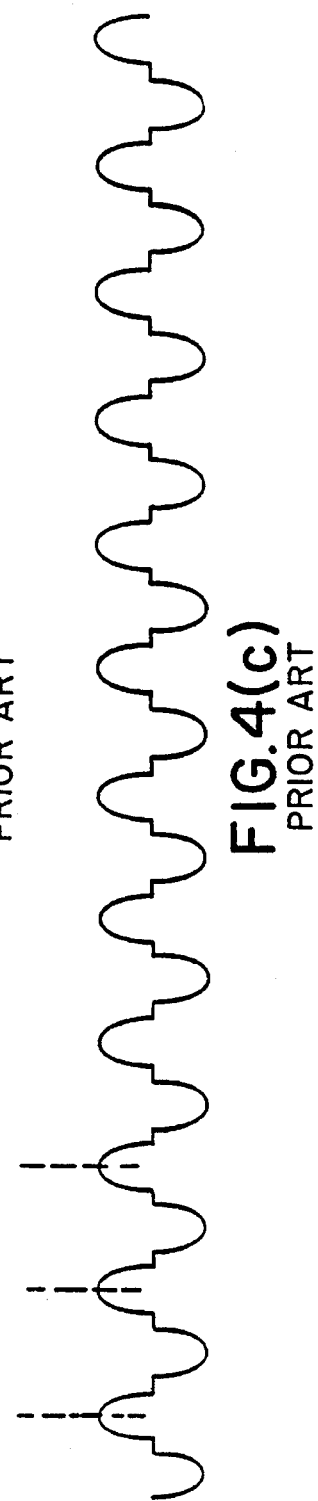
FIG. 4c graphically illustrates the magnitude of the current flowing on the shared neutral conductor as a result of the currents illustrated in FIG. 4b.

FIG. 4(c) graphically illustrates the magnitude of the current flowing on the shared neutral conductor N as a result of the currents illustrated in FIG. 4(b). As is apparent from FIG. 4(c), all of the current flow is present in the shared neutral conductor, notwithstanding the fact that equal loads are connected between each phase and the neutral (i.e., the loads are balanced). Due to the "pulsed" nature of the current flow occurring in each phase, current cancellation effects which might otherwise reduce or eliminate current flowing in the shared neutral conductor do not reduce or eliminate current in the neutral in this instance. As long as the conduction angles of the pulses illustrated in FIG. 4(b) are 60° or less, current cancellation will not occur in the neutral conductor since there is no "overlapping" of currents from the individual phases.

FIG. 5 shows an electrical power distribution system in which the problem of excessive neutral conductor currents of the type illustrated in FIG. 4(c) is addressed. Elements 20–28 of FIG. 5 are essentially identical to corresponding elements of FIG. 3 and, thus, have been numbered accordingly. Circuits 36 and 38 differ, however, from circuits 29 and 30. Specifically, circuits 36 and 38 include transforming devices 40 and 42 which transform the three-phase, 480 volt input power to a six-phase, 208 volt (line-to-line) output to provide six phases (L1, L2, L3, L4, L5 and L6 in circuit 36 and L7, L8, L9, L10, L11 and L12 in circuit 38), each of which is separated by 60 electrical degrees from the others. FIG. 6 is a vector phase diagram which illustrates the phase separation existing between phases L1–L6. As illustrated in FIG. 6, phases L1, L2 and L3 are separated by 180 electrical degrees from phases L4, L5 and L6, respectively.

FIG. 7 illustrates the current flowing in each of phases L1–L6 when a power supply circuit of the type illustrated in FIG. 1 is connected between each of these phase conductors and the shared neutral conductor N. As illustrated in FIG. 7, each of the current peaks caused by current flow in phases L1, L2 and L3 is offset by an equal and opposite current flowing in phases L4, L5 and L6. Thus, the net current flow in the shared neutral conductor N as a result of the loads illustrated in FIG. 7 is zero. In other words, "pulsed" currents of the type illustrated in FIG. 2(b) flowing in the shared neutral conductor as a result of the loads connected between phases L1, L2 and L3 and the shared neutral are offset or cancelled by equal and opposite currents flowing in the shared neutral due to similar loads connected between phases L4, L5 and L6 and the shared neutral. To the extent the loads on phases separated by 180 electrical degrees are identical, all currents, including the fundamental and all harmonics, cancel. The currents illustrated in FIG. 7 are, of course, idealized. In practical applications, "perfect" balance between opposing phases will rarely be achieved and is not necessary to provide the benefit of substantial reductions of current which might otherwise flow in the neutral conductor due to the presence of pulsed, non-linear loads in the system. References to "balanced" loads or "balancing" of loads in this application are not to be taken as requiring that precisely the same number of loads be connected between each phase and the shared neutral conductor.

The six-phase arrangement described above may be used to effectively reduce or eliminate excess neutral currents flowing in the neutral conductor on the load side of transforming devices 40 and 42 of circuits 36 and 38, respectively. Illustrated in FIG. 8, however, is a separate problem which still exists on the generator side of transforming devices 40 and 42. FIG. 8 shows a graphical representation of the instantaneous power demanded by circuits 36 and 38 operating with the loads illustrated in FIG. 7. Unlike the neutral currents on the load side of devices 40 and 42, the instantaneous power demanded by each load connected between phases L1–L6 and the shared neutral N does not cancel, but is additive to produce the "pulsed" power demand illustrated in FIG. 8. This type of power demand is more difficult for an electric utility to satisfy than is an essentially constant, steady demand. Indeed, in some locations, utility customers connecting such loads to the utility system will be penalized in the form of higher rates or other assessments.

The condition illustrated in FIG. 8 can be addressed, and substantially improved, by shifting the respective phases of circuits 36 and 38 relative to one another. In other words, phases L7–L12 of circuit 38 can be shifted relative to the respective phases L1–L6 of circuit 36 to smooth the overall demand for power, as viewed from the generator side of transforming devices 40 and 42. FIG. 9 illustrates the power demanded by circuits 36 and 38, respectively, after each of the phases L7–L12 of circuit 38 are shifted by 30 electrical degrees relative to the corresponding phases L1–L6 of circuit 36. FIG. 10 illustrates the sum of the two waveforms shown in FIG. 9, and thus illustrates the power demand as seen by the utility system on the generator side of transforming devices 40 and 42. As is readily apparent, the power demand illustrated in FIG. 10 is much more constant and steady than that illustrated in FIG. 8 (the difference between the peak value and the average value of the waveform of FIG. 10 is approximately 8%). This appears much more like a resistive load to the generator. In addition to easing other problems on the generator side of the transformer, this smoothing of the power demand tends to correct the large calibration shifts which occur in inductive watt-hour meters due to the presence of the pulsed, non-linear load currents.

As noted, FIG. 9 illustrates the power demanded by circuits 36 and 38, respectively, after each of the phases of circuit 38 are shifted by 30 electrical degrees relative to the corresponding phases of circuit 36. There are several ways in which this relative phase shift can be accomplished. However, it may be advantageous to achieve this relative separation by shifting phases L1–L6 of circuit 36 by 15 electrical degrees in one direction (relative to, for instance, the incoming phases), and shifting phases L7–L12 of circuit 38 by 15 degrees in the opposite direction. This arrangement may result in additional "smoothing" of the instantaneous power demanded from the generator due to the likely presence of other loads which are "in-phase" with the incoming power source.

Although the arrangement in FIG. 5 utilizes two transforming devices (40 and 42), the respective outputs of which are phase shifted to reduce the relative magnitudes of the power "pulses" on the generator side of the transformer, other arrangements may be used to accomplish this result. For example, a single transforming device having a twelve-phase output may also be used. Further, "smoothing" of the instantaneous power demanded from the generator can be accomplished in a system having fewer phases, and in which neutral current cancellation on the load side does not occur. For example, a system having a three-phase input and a three phase output in which each of the output phases is shifted, for example, by 30 electrical degrees relative to each of the respective input phases will smooth the power demanded from the generator by pulsed, non-linear loads. This arrangement will provide benefits to the utility company (or other power provider), even in the absence of the current cancellation benefits on the load side discussed above.

FIG. 11 schematically illustrates a transforming device 50 which can be used in accordance with the present invention. Device 50 has a delta-connected primary which provides power to three primary windings 52, 54 and 56. The respective secondaries associated with each of the primary windings comprise main secondary windings 58, 60 and 62, and a plurality of smaller windings labeled T1, T2 and T3, respectively. These smaller windings are connected in series with one or the other of each side of secondary windings 58, 60 and 62, as illustrated, to provide a 12-phase output in which, for example, phases L1–L6 are separated from each other by 60 electrical degrees, phases L7–L12 are separated from each other by 60 electrical degrees, and phases L1–L6 are each shifted 15 electrical degrees in one direction (relative to the input power source) and phases L7–L12 are each shifted 15 electrical degrees in the other direction.

Using a device such as that illustrated in FIG. 11, loads can be distributed between phases L1–L6 and L7–L12 so as to effectively eliminate, or reduce, current on the shared neutral conductor N on the load side of the transformer. Phases L1–L6 can further be shifted, relative to respective phases L7–L12, to reduce the instantaneous magnitude of the power demands on the generator side of the transformer. In "ideal" circumstances, loads will be evenly distributed between each of the phases and neutral to achieve maximum reduction of current in the neutral conductor, and the two groups of six-phases will be uniformly shifted to smooth the instantaneous power demanded from the generator to the greatest degree. However, under more realistic conditions, load distributions which are not precisely even, and varying degrees of relative phase shifting, may be most effective in mitigating the problems discussed above. The ability to "tune" the system by periodically re-distributing loads and adjusting relative phase shifts may be desirable and justifiable in particular circumstances. In large installations, additional six-phase and/or twelve-phase circuits, utilizing varying degrees of phase shifting, may further reduce the negative effects caused by large concentrations of loads such as that shown in FIG. 1.

FIG. 12 shows a schematic wiring diagram of an alternative embodiment of the present invention which may be particularly advantageous in smaller power systems and/or in retrofitting existing installations. The system illustrated in FIG. 12 is similar in many respects to the prior art system illustrated in FIG. 3 and like reference numerals are used to indicate like elements, accordingly. However, in the circuit of FIG. 12, an additional element, in the form of transforming device 70 has been added. The primary side of transforming device 70 is connected to the three-phase output of device 32. The three-phase secondary output of device 70 (i.e., phases L4, L5 and L6) may be shifted by 180 electrical degrees, relative to phases L1, L2 and L3, respectively, to reduce or eliminate current flow in the shared neutral conductor resulting from connection of a plurality of pulsed, non-linear loads between the respective phases and the neutral. Alternatively, each of phases L4, L5 and L6 may be shifted by 30 electrical degrees, for instance, to smooth the demand for power on the generator side of device 32. Device 32 may also be wound to shift phases L1, L2 and L3 relative to the phases of the input power source by, for instance, 15 electrical degrees in the direction opposite the 30 degree shift effected by device 70.

FIGS. 13 and 14 show schematic wiring diagrams of additional alternative embodiments of the present invention which, like the arrangement of FIG. 12, may be particularly advantageous in smaller power systems and/or in retrofitting existing installations. These systems also illustrate the manner in which an autotransformer may be used in the invention. FIG. 13 shows an arrangement 72 which includes an input 74 having a single line conductor L1 and a neutral conductor N. An autotransformer 76 is connected on a first end 78 to input conductor L1. The other end 80 of autotransformer 76 is connected to an output conductor designated L2. Thus, the output 82 of arrangement 72 comprises conductors (or phases) L1 and L2, and the neutral conductor N. Neutral conductor N is also connected to a center tap 84 of autotransformer 76.

In the arrangement illustrated in FIG. 13, two output circuits are provided: L1-N and L2-N. The phase of the L2-N circuit is shifted by 180 electrical degrees relative to circuit L1-N. Accordingly, if non-linear loads are evenly distributed between these two circuits, the desired cancellation of neutral currents on shared neutral conductor N will occur.

FIG. 14 shows a similar arrangement 86 in which two input phases L1 and L2 are similarly connected to respective autotransformers 88 and 90. The resulting output circuits are L1-N, L2-N, L3-N and L4-N. The phases of circuits L3-N and L4-N are shifted by 180 electrical degrees, respectively, relative to circuits L1-N and L2-N. It should be readily apparent that, if input phases L1 and L2 are two phases of a three-phase system, additional and substantially identical arrangements can be provided for the remaining combinations of the input phases (i.e., L1-L3 and L2-L3) to provide three sets of output circuits, each set having four circuits as illustrated in FIG. 14. In such an arrangement, the relative phase angles of each of the circuits in a set can vary, relative to the phase angles of corresponding circuits in the other sets, to achieve reductions in the instantaneous level of power demanded from any one input phase, as has been previously discussed.

Although FIGS. 13 and 14 illustrate alternative embodiments of the invention, the broad concepts embodied in arrangements 72 and 86 are the same as those embodied in the embodiment, for example, of FIG. 12.

FIG. 15 shows an alternative embodiment of the invention which is similar to the circuit shown in FIG. 13. In FIG. 15, a three-phase circuit breaker box 100 is shown to contain a plurality of circuit breakers 102. Each of breakers 102 is connected at its input to one of three phases provided from a three-phase service entrance (not shown). The output sides of two of the circuit breakers 102 are connected, as illustrated in FIG. 15, to a first output phase which is identified as phase L1. The output of a second breaker 102 is connected to an autotransformer (similar to autotransformer 76 of FIG. 13) to shift the phase of the circuit by 180° relative to circuit L1. Accordingly, this output is identified as $\overline{L1}$. These circuits share a neutral conductor N in the same manner as discussed above in connection with FIG. 13. In this arrangement, each of the circuits L1 and $\overline{L1}$ can provide current up to the full rating of each of the individual circuit breakers 102. This is in contrast to the arrangement of FIG. 13 in which the output of circuits L1 and L2 must be shared through a common circuit breaker having an output connected to phase L1.

Also shown in FIG. 15 is optional coil 104 which may be necessary or desirable for connection in series with phase L1 to assure that the respective impedances of phases L1 and $\overline{L1}$ remain substantially equal. Again, this is an optional feature which may be necessary in certain situations and under certain conditions, but unnecessary in others.

FIG. 16 shows a similar arrangement which includes a breaker box 106 having a plurality of circuit breakers 108 which have outputs ends connected to four phases (L1 and L2, $\overline{L1}$ and $\overline{L2}$), as illustrated. This arrangement is similar to the arrangement shown in FIG. 14, except that current can be drawn through each of the phases shown in FIG. 16 up to the maximum current ratings of each of the breakers 108. If necessary, coils similar to coil 104 of FIG. 15 may be provided in series with phases L1 and L2.

From the preceding description of the preferred embodiments, it is evident that the objects of the invention are attained. Although the invention has been described and illustrated in detail, it is to be clearly understood that the same is intended by way of illustration and example only and is not to be taken by way of limitation. The spirit and scope of the invention are to be limited only by the terms of the appended claims.

What is claimed is:

1. A method of providing a source of alternating current electrical power to a plurality of loads, including a plurality of non-linear loads which draw power from the source for only a portion of the alternating current cycle, comprising the steps of:

providing an input source of three-phase electrical power to a primary side of a power transforming device;

transforming the input power source to provide an output power source at a secondary side of the power transforming device, said output power source comprising at least two phases separated from one another by a phase angle and a shared neutral; and distributing the loads connected between each phase of the output power source and the shared neutral so as to utilize the phase angle separation between the phases to reduce by current cancellation the current which would otherwise flow in the shared neutral conductor due to the presence of the non-linear loads.

2. A method of providing a source of alternating current electrical power to a plurality of loads, including a plurality of non-linear loads which draw power from the source for only a portion of the alternating current cycle, comprising the steps of:

providing an input source of three-phase electrical power to a primary side of a power transforming device;

transforming the input power source to provide an output power source at a secondary side of the power transforming device, said output power source comprising at least two phases and a shared neutral; and distributing the loads connected between each phase of the output power source and the shared neutral so as to reduce by current cancellation the current which would otherwise flow in the shared neutral conductor due to the presence of the non-linear loads;

wherein said transforming step includes providing at least two sets of two phases, and wherein each of the phases in a first of said two sets is shifted relative to a respective phase of the second set, so as to reduce variations in the level of instantaneous power drawn from the input source which would otherwise occur due to the presence of the non-linear loads.

3. A method according to claim 2, wherein said phases of the first set are shifted by approximately 90 electrical degrees relative to respective ones of the phases in the second set.

4. A method according to claim 3, wherein each of the phases in the two sets is shifted in opposite directions relative to the input power source.

5. A method according to claim 4, wherein each of the phases in the two sets is shifted approximately 45 electrical degrees relative to the input power source.

6. A power distribution system for supplying alternating current electrical power to a plurality of loads, including a plurality of non-linear loads which draw power from the system for only a portion of the alternating current cycle, comprising:

means for providing an input source of electrical power to a primary side of a power transforming device; and means for transforming the input power source to provide an output power source at a secondary side of the power transforming device, said output power source comprising at least two phases and a shared neutral;

wherein the plurality of loads connected to the system are distributed between each phase of the output power source and the shared neutral so as to reduce by current cancellation the current which would otherwise flow in the shared neutral conductor due to the presence of the non-linear loads; and wherein said output power source comprises two phases, and wherein said phases are separated from each other by approximately 180 electrical degrees.

7. A method of providing a source of alternating current electrical power to a plurality of loads, including a plurality of non-linear loads which draw power from the source for only a portion of the alternating current cycle, comprising the steps of:

providing an input source of electrical power to a primary side of a power transforming device;

transforming the input power source to provide an output power source at a secondary side of the power transforming device, said output power source comprising at least two sets of at least two phases and a shared neutral, and wherein each of the phases in a first of said two sets is shifted, relative to a respective phase of the second set so as to reduce variations in the level of instantaneous power drawn from the input source which would otherwise occur due to the presence of the non-linear loads; and balancing the distribution of loads connected between each phase of the output power source and the shared neutral so as to reduce by current cancellation the current which would otherwise flow in the shared neutral conductor due to the presence of the non-linear loads.

8. A power distribution system for supplying alternating current electrical power to a plurality of loads, including a plurality of non-linear loads which draw power from the system for only a portion of the alternating current cycle, comprising:

means for providing an input source of electrical power to a primary side of a power transforming device; and means for transforming the input power source to provide an output power source at a secondary side of the power transforming device, said output power source comprising at least two phases separated from one another by a phase angle and a shared neutral;

wherein the plurality of loads connected to the system are distributed between each phase of the output power source and the shared neutral so as to utilize the phase angle separation between the phases to reduce by current cancellation the current which would otherwise flow in the shared neutral conductor due to the presence of the non-linear loads.

9. A power distribution system for supplying alternating current electrical power to a plurality of loads, including a plurality of non-linear loads which draw power from the system for only a portion of the alternating current cycle, comprising:

means for providing an input source of electrical power to a primary side of a power transforming device; and means for transforming the input power source to provide an output power source at a secondary side of the power transforming device, said output power source comprising at least two phases and a shared neutral;

wherein the plurality of loads connected to the system are distributed between each phase of the output power source and the shared neutral so as to reduce by current cancellation the current which would otherwise flow in the shared neutral conductor due to the presence of the non-linear loads; and wherein said transforming means comprises means for providing at least two sets of two phases, and wherein each of the phases in a first of said two sets is shifted relative to a respective phase of the second set, so as to reduce variations in the level of instantaneous power drawn from the input source which would otherwise occur due to the presence of the non-linear loads.

10. A power distribution system according to claim 9, wherein said phases of the first set are shifted by approximately 90 electrical degrees relative to respective ones of the phases in the second set.

11. A power distribution system according to claim 10, wherein each of the phases in the two sets is shifted in opposite directions relative to the input power source.

12. A power distribution system according to claim 11, wherein each of the phases in the two sets is shifted approximately 45 electrical degrees relative to the input power source.

13. A power distribution system according to claim 9, wherein said input source of electrical power comprises a single phase having a line conductor and a neutral conductor, and wherein said transforming means comprises an autotransformer serially connected to the line conductor.

14. A power distribution system according to claim 13, wherein the neutral conductor of the input source is connected to a center tap of the autotransformer and to the shared neutral of the output power source.

15. A power distribution system according to claim 9, wherein said input power source comprises two phases having respective line conductors and a shared neutral conductor, and wherein said transforming means comprises two autotransformers, each serially connected to one of said line conductors, and wherein the shared neutral conductor is connected to respective center taps of the autotransformers and the shared neutral of the output power source.

16. A method of providing a source of alternating current electrical power to a plurality of loads, including a plurality of non-linear loads which draw power from the source for only a portion of the alternating current cycle, comprising the steps of:

providing an input source of three-phase electrical power to a primary side of a power transforming device;

transforming the input power source to provide an output power source at a secondary side of the power transforming device, said output power source comprising at least two phases and a shared neutral; and distributing the loads connected between each phase of the output power source and the shared neutral so as to reduce by current cancellation the current which would otherwise flow in the shared neutral conductor due to the presence of the non-linear loads;

wherein said output power source comprises two phases, and wherein said phases are separated from each other by approximately 180 electrical degrees.

17. A power distribution system for supplying alternating current electrical power to a plurality of loads, including a plurality of non-linear loads which draw power from the system for only a portion of the alternating current cycle, comprising:

means for providing an input source of electrical power to a primary side of a power transforming device; and means for transforming the input power source to provide an output power source at a secondary side of the power transforming device, said output power source comprising at least two sets of two phases and a shared neutral, and wherein each of the phases in a first of said two sets of two phases are shifted, relative to respective phases of the second set of the two phases so as to reduce variations in the level of instantaneous power drawn from the input source which would otherwise occur due to the presence of the non-linear loads; and wherein the plurality of loads are connected between each phase of the output power source and the shared neutral so as to reduce by current cancellation the current which would otherwise flow in the shared neutral conductor due to the presence of the non-linear loads.

18. A method of providing a source of alternating current electrical power to a plurality of loads, including a plurality of non-linear loads which draw power from the source for only a portion of the alternating current cycle, comprising the steps of:

providing an input source of electrical power to a primary side of a power transforming device;

transforming the input power source to provide an output power source at a secondary side of the power transforming device, said output power source comprising a plurality of phases; and shifting at least one phase of the output power source relative to at least one phase of the input source so as to reduce the level of instantaneous current drawn from the input source due to the presence of the non-linear loads.

* * * * *

UNITED STATES PATENT AND TRADEMARK OFFICE
CERTIFICATE OF CORRECTION

PATENT NO. : 5,537,309
DATED : July 16, 1996
INVENTOR(S) : John K. Marsh et al.

It is certified that error appears in the above-identified patent and that said Letters Patent is hereby corrected as shown below:

On Title Page, please correct the [*] Notice to read as follows:

The term of this patent shall not extend beyond the expiration date of Pat. No. 5,107,410.

Signed and Sealed this

Twelfth Day of November, 1996

Attest:

BRUCE LEHMAN

Attesting Officer     Commissioner of Patents and Trademarks